United States Patent [19]

Bertini

[11] Patent Number: 4,671,553

[45] Date of Patent: Jun. 9, 1987

[54] GRIPPER DEVICE

[76] Inventor: Millo Bertini, 679 Garden St., Trumbull, Conn. 06611

[21] Appl. No.: 863,348

[22] Filed: May 15, 1986

[51] Int. Cl.[4] .......................... B25B 5/04; B25B 15/08
[52] U.S. Cl. ..................................... 294/88; 294/99.1; 294/100; 294/116; 294/115; 901/31
[58] Field of Search .................. 294/88, 100, 99.1, 95, 294/97, 106, 115, 116; 269/32, 34, 257, 264, 233, 234; 414/739, 753, 751; 901/31, 36-39

[56] References Cited

U.S. PATENT DOCUMENTS 3,929,367 12/1985 Bjurling et al. ..................... 294/116
4,540,211 9/1985 Masserang ......................... 294/99.1

FOREIGN PATENT DOCUMENTS 672014 7/1979 U.S.S.R. .............................. 294/88

Primary Examiner—James B. Marbert
Attorney, Agent, or Firm—Arthur T. Fattibene

[57] ABSTRACT

A gripper device which includes a piston and cylinder assembly wherein the piston rod extends through one end of the cylinder, and which cylinder end is defined with a concave slot. Connected to the end of the piston rod is a gripper formed as a resilient member defining a pair of opposed finger portions and an interconnecting flexible web portion. The flexible web portion extends transversely of the outer concave slot. The arrangement is such that the actuation of the piston draws flexible web portion toward the concave slot surface of the cylinder causing the finger portions to flex between a gripping and non-gripping position; and whereby the gripper maintains a spring bias on the piston.

6 Claims, 4 Drawing Figures

GRIPPER DEVICE

This invention relates to a gripper device and/or manipulator for gripping and releasing a work piece.

PROBLEM AND PRIOR ART

Gripper devices of varying constructions are known. Such known gripper devices and/or manipulators include variously constructed finger portions which define the terminal ends of relatively complex lever arrangements requiring various types of pivotal connections. As a result, many of the known types of gripper devices require relatively complex mechanical movements, which in many instances are difficult and expensive to manufacture and assemble. Some of the known types of gripper devices are disclosed in U.S. Pat. Nos. 2,641,806; 3,170,322; 3,312,496; 3,371,953; 3,556,315; 4,492,400; 4,509,783; 4,540,211 and 4,540,212.

OBJECTS

An object of this invention is to provide for a relatively simple gripper device having a minimum of component parts, and which is relatively inexpensive to manufacture and/or to produce.

Another object is to provide a gripper device which can function as a manipulator for gripping and transporting a work piece from station to station.

Another object is to provide a gripper device having a construction that does not need lubrication and thereby making the gripper device desirable for use in clean room operations.

SUMMARY OF THE INVENTION

The foregoing objects and other features and advantages are attained by a gripper device or manipulator that includes a piston and cylinder assembly wherein the cylinder body is defined with an end wall formed with a generally concave slot or surface portion. A piston is reciprocally mounted within the cylinder body and a piston rod connected to the piston extends beyond the concave slotted end wall. Connected to the end of the piston is a U-shaped gripper to define a pair of opposed fingers interconnected by a resilient or flat spring web. The arrangement is such that the resilient web portion extends transversely of the concave outer end slot so that when the piston is actuated, the web portion is caused to flex and draw the extended finger portions toward each other and into a gripping position. In doing so, the resilient web portion maintains a spring bias on the piston to return it and the associated fingers to their respective inoperative, non-gripping position when the pressure acting on the piston is released.

FEATURES

A feature of this invention resides in the provision of a gripper device having a unitary gripper member formed of a flexible or resilient spring material which is arranged to flex between an operative gripping position and inoperative non-gripping position.

Another feature resides in the provision of a gripper or manipulator assembly constructed so that it can function without lubrication.

Another feature resides in the provision of a gripper assembly having a relatively simple piston and cylinder actuator which is maintained under a spring bias by the construction and function of the gripper member which the piston operates.

Another feature resides in a gripper device which includes a minimum of component parts.

Other features and advantages will become more readily apparent when considered in view of the drawing and description in which.

DETAIL DESCRIPTION

Figure 1:
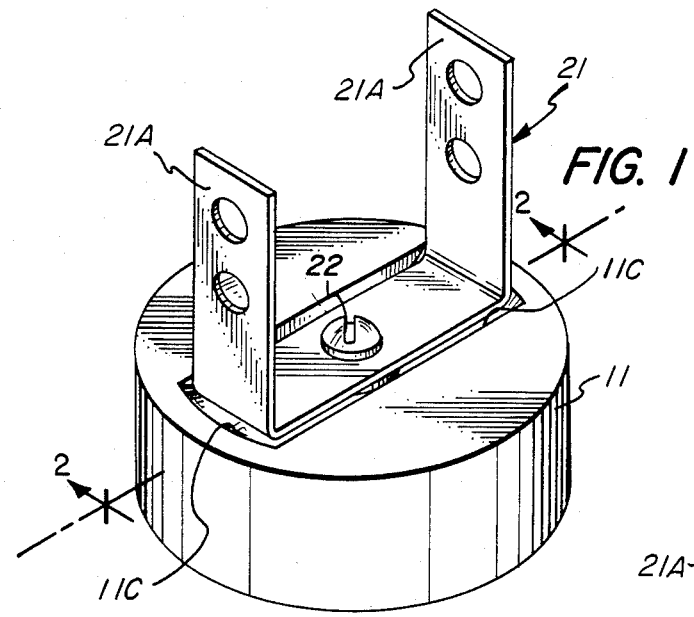
FIG. 1 is a perspective view of a gripper device embodying the invention.
Figure 3:
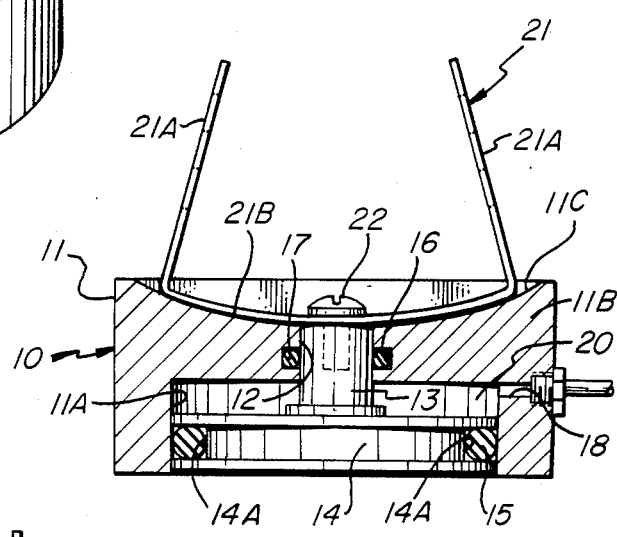
FIG. 3 is a sectional view similar to FIG. 2 showing the parts in a gripping position.

Referring to the drawing, there is shown therein a gripper device 10 embodying the invention. The gripper device 10 comprises a piston and cylinder assembly which includes a cylinder body 11 defining a piston chamber 11A which opens to one end of the cylinder body 11. The other end of the cylinder body 11 is provided with an end wall 11B, which defines the top or end of the piston chamber 11A. In accordance with this invention, the end wall 11B is provided with an outer concave slot 11C extending transversely so as to define a concave contour or slot. A bore 12 extends through the end wall 11B through which the end of a piston rod 13 extends.

The piston rod 13 in turn is connected to a piston 14 which is reciprocally mounted in the piston chamber 11A. The piston 14 is provided with an annular groove 14A to define a pair of flanges to define a seat for receiving a sealing or "O" ring 15. The arrangement is such that the piston is reciprocally mounted within the piston chamber 11A in fluid sealing relationship. An annular groove 16 also circumscribes the bore 12 for receiving a sealing or "O" ring 17 to define a fluid tight seal about the piston rod 13.

A fluid inlet 18 extends through the cylinder body 11 for introducing an actuating fluid, e.g. compressed air, hydraulic fluid, or the like, in the space or chamber 20 defined between the piston 14 and the inner surface of the end wall 11b. It will be understood that the introduction of a fluid pressure into chamber 20 will force or displacement of the piston 14 and connected piston rod away from the end wall 11B, as in the illustrated embodiment.

Figure 2:
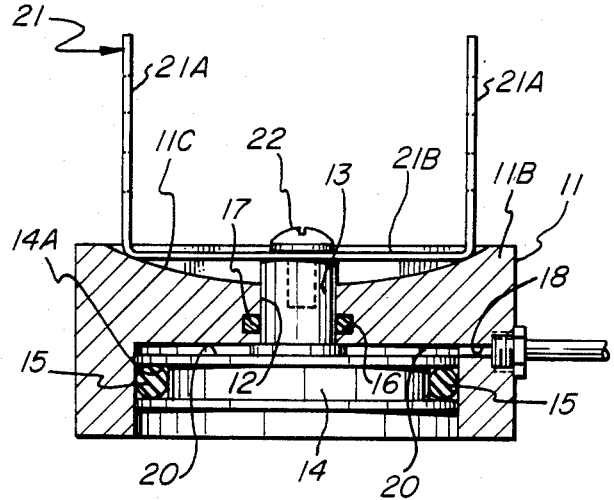
FIG. 2 is a sectional view taken along line 2—2 on FIG. 1 showing the parts in a non-gripping position.
Figure 4:
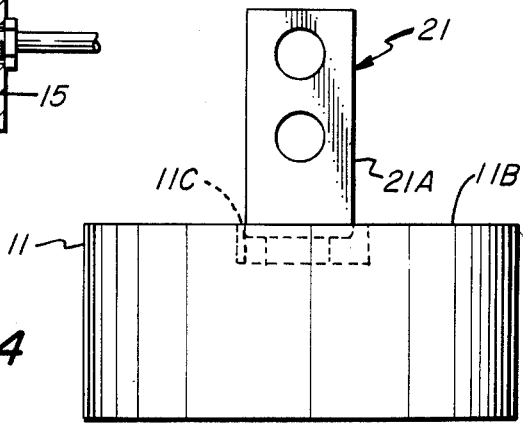
FIG. 4 is an end view of the gripper device.

Connected to the free end of the piston 13 is a gripper means 21. In accordance with this invention, the gripper means includes a resilient member which is illustrated as a generally U-shaped member having a pair of opposed finger portions 21A, 21A interconnected by a transversely resilient web portion 21B. The web or transverse portion 21B of the gripper means 21 is secured or connected to the end of the piston rod 13 by a suitable fastener, e.g. a screw 22 or the like. As best seen in FIG. 2, the end portions of the transverse or web portion 21B normally bears along an outer peripheral portion of the concave surface 11C of the slot in the cylinder body 11.

With the construction of the gripper device 10 described, it will be noted that when a fluid pressure is introduced into the chamber 20 to exert a pressure on the face of the piston 14, the piston 13 is displaced away from the end wall 11B causing the piston rod 13 to be retracted. In doing so, the piston rod 13 will draw the transverse or web portion 21B toward the outer concave surface 11C, causing the web portion to bow inwardly. The bowing of the transverse portion or web 21B toward the concave surface 11C, in turn causes the connected finger portions 21A, 21A to flex inwardly, thereby drawing the tip ends thereof toward each other. In doing so, the tip end of the fingers will close and grip onto any work piece disposed therebetween. As long as fluid pressure is maintained on the head of the piston 14, the finger portions 21A, 21A will be maintained in an operative or gripping position. Upon release of the fluid pressure acting on the head of the piston 14, the inherent resiliency of the transverse or web portion 21B will return the piston 14, connected piston rod 13 and the finger portions 21A, 21A to their respective normal or inoperative or non-gripping position, whereby any work piece gripped between the finger portions 21A, 21A is readily released.

With the construction described, it will be apparent that the gripper device 10 does not require lubrication, and it is devoid of any complex mechanical linkages and/or pivotal connections. The device 10 comprises a minimum of component parts which can be readily assembled and disassembled with little effort and a maximum of ease. The device 10 is positive in operation, and it is particularly suitable for use as a manipulator or robotic hand for handling various work pieces; and it is particularly applicable to clean room operation. The gripper means 21 may be formed of a spring material, e.g. spring steel as a unitary component; having a generally U-shaped configuration.

While the invention has been described with respect to a particular embodiment it will be understood and appreciated that variations and modifications may be made without departing from the spirit or scope of the invention.

What is claimed is:

1. A gripper device comprising
    a piston and cylinder assembly including a cylinder body having an end wall;
    and a piston reciprocally mounted on said cylinder body,
    a piston rod connected to said piston,
    said piston rod extending through a bore formed in the end wall of said cylinder body,
    said end wall being defined with a concave cirvilinear surface portion,
    and a gripper means,
    said gripper means including a resilient member disposed contiguous to said concave surface portion,
    means for securing said resilient member to said piston rod,
    and means for introducing an actuating fluid into said cylinder body to effect displacement of said piston whereby the displacement of said piston and connected piston rod causes said resilient member to be drawn toward said concave surface portion to flex between an inoperative non-gripping position to an operative gripping position.

2. A gripper device as defined in claim 1 wherein said gripper means comprises a U-shaped member having a pair of spaced apart finger portions, and a transversely extending portion interconnected between said finger portion,
    said transversely extending portion being formed of a flexible spring type material,
    and said transversely extending portion extending transversely of said end wall of said cylinder body.

3. A gripper device as defined in claim 1, wherein said resilient member comprises a U-shaped member having a pair of opposed finger portions and an interconnecting web portion, said web portion and finger portion being integrally connected,
    said web portion being connected intermediate the ends thereof to said piston rod, whereby the actuation of said piston effects said finger portion to move between an operative gripping position and an inoperative non-gripping position.

4. A gripper device as defined in claim 3, wherein said U-shaped member comprises an integrated U-shaped member.

5. A gripper device comprising
    a cylinder body having a chamber formed therein, and an end wall defining one end of said chamber,
    said end wall having a bore extending therethrough,
    and said end wall having a transversely extending outer slot formed therein, and said slot having a concave bottom surface,
    a piston reciprocally mounted in said chamber,
    a piston rod connected to said piston,
    said piston rod having an end portion extending through the bore of said end wall, said bore being disposed intermediate the ends of said sot,
    means for introducing an actuating fluid into said chamber between said piston and said end wall,
    a gripper means connected to said end portion of said piston,
    said gripper means including a pair of spaced apart finger portions and an interconnecting web portion,
    said web portion being formed of a flexible spring material,
    and said web portion extending transversely of said outer slot in said end wall whereby the ends of said web portion bear upon the outer peripherial portions of said slot and whereby upon the actuation of said piston, said finger portions are flexed inwardly toward each other to grip a work piece disposed therebetween.

6. A gripper device comprising
    a cylinder body having a chamber formed therein,
    said body having an end wall forming one end of said chamber,
    said end wall having an outer concave slot extending transversely thereof,
    said end wall having a bore extending therethrough and intermediate the ends of said slot,
    a piston reciprocally mounted within said chamber,
    a piston rod connected to said piston and having a free end extending through said bore,
    means for introducing an actuating fluid into said chamber between said piston and said end wall,
    a gripper means connected to said free end of said piston rod,
    said gripper means including a resilient transversely extending member disposed in alignment with said slot,
    means for securing said resilient transversely extending member to the free end of said piston rod,
    said resilient transversely extending member having end portions disposed adjacent the peripheral portion of said outer concave slot in said end wall,
    a pair of spaced apart finger portions connected to said transverse member,
    said finger portions and said transverse member being integrally formed as a unitary member, whereby the displacement of said piston when actuated causes said piston rod to draw said resilient transverse member toward said concave slot causing the transverse member to bow, thereby causing said finger portions to be flexed inwardly toward one another to grip a work piece therebetween.

* * * * *